March 30, 1943.                M. BROSIUS                2,315,394
                             INSIDE MOLD FORM
                   Filed April 25, 1940        2 Sheets-Sheet 1
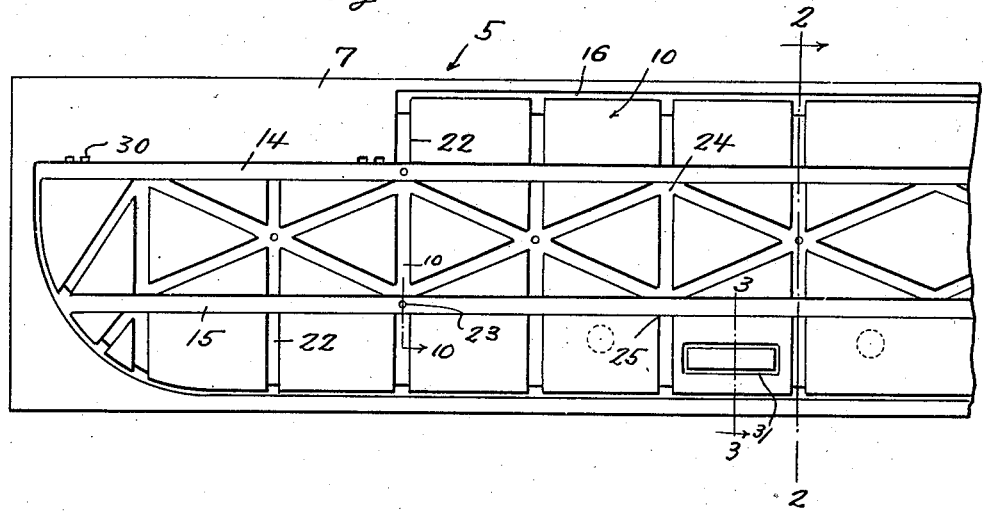
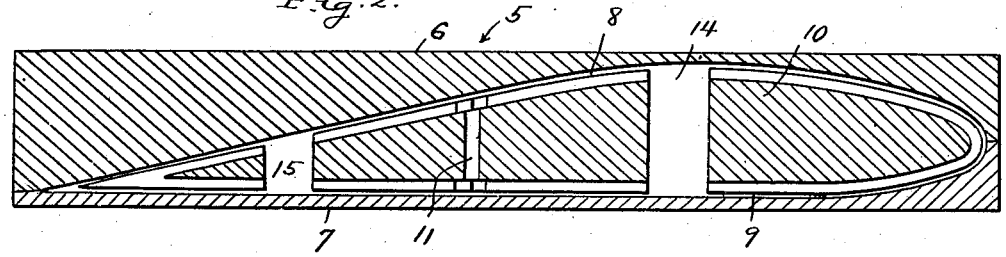
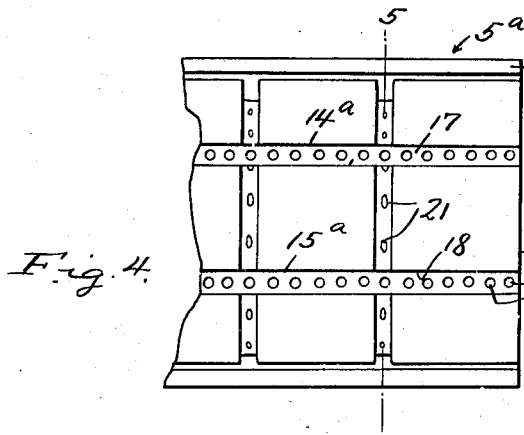
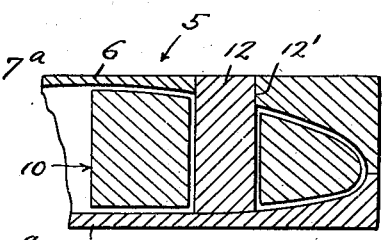
Inventor
Murray Brosius
By Clarence A. O'Brien
Attorney

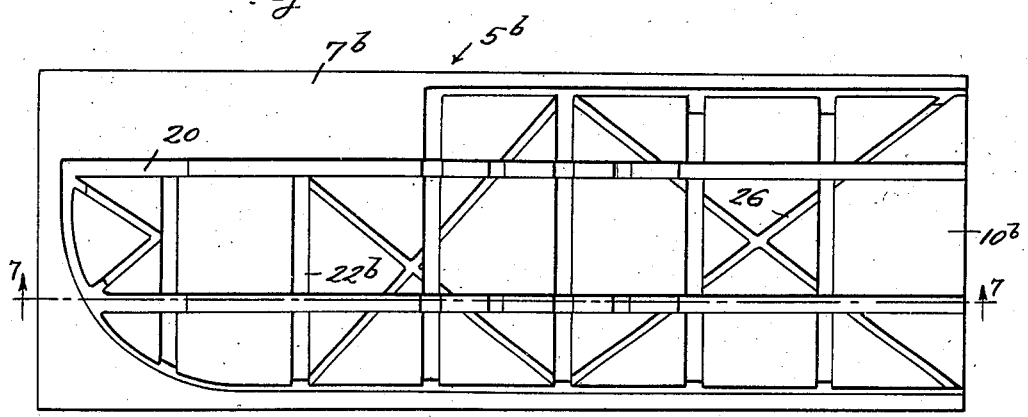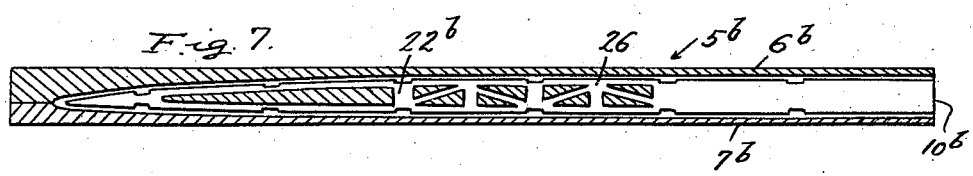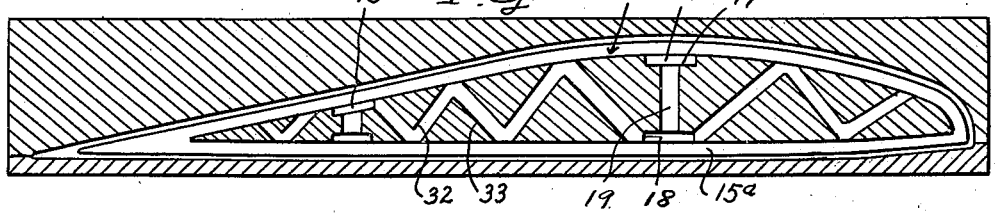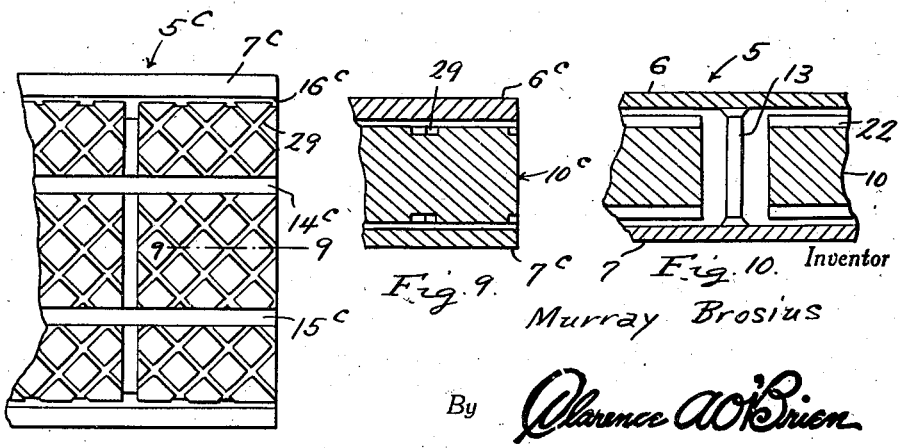

Patented Mar. 30, 1943

2,315,394

UNITED STATES PATENT OFFICE 2,315,394

INSIDE MOLD FORM

Murray Brosius, Nashville, Tenn.

Application April 25, 1940, Serial No. 331,648

4 Claims. (Cl. 18—42)

My invention relates to improvements in the molding of hollow objects by the use of an inside core, and the primary object of the invention is to provide an arrangement of this character in which the inside core is made removable after the molding operation without destruction or impairment of the molded form.

Another important object of my invention is to provide an arrangement of the character indicated above which is capable of molding rigid forms of varying thicknesses and contours, and thereby provide for successfully and economically molding such molded forms as aeroplane wings, and the like of reinforced or unreinforced character, having transverse reinforcements of the same material as the form and molded in the same operation, especially for the making of a one-piece plastic or other moldable composition aeroplane wing characterized by trussed spars and trussed ribs and diagonal braces formed internally therein and further characterized by greater strength for a given weight.

Other important objects and advantages of my invention will be apparent from a reading of the following description taken in connection with the drawings, wherein for purposes of illustration I have shown preferred embodiments of apparatus in accordance with the present invention.

In the drawings:

Figure 1 is a top plan view showing the lower half of a mold for molding an aeroplane wing, and showing the inside mold form or core in place.

Figure 2 is an enlarged transverse vertical sectional view taken through Figure 1 approximately on the line 2—2 and looking toward the right in the direction of the arrow and showing the upper half of the mold in place.

Figure 3 is an enlarged fragmentary transverse vertical sectional view taken through Figure 1 approximately on the line 3—3 and looking toward the right in the direction of the arrow.

Figure 4 is a fragmentary top plan view showing a different arrangement of inside mold form or core.

Figure 5 is an enlarged transverse vertical sectional view taken through Figure 4 approximately on the line 5—5.

Figure 6 is a top plan view showing another type of inside mold form or core in place in the lower half of a mold.

Figure 7 is a longitudinal vertical sectional view taken through Figure 6 approximately on the line 7—7 and looking upwardly in the direction of the arrow.

Figure 8 is a fragmentary top plan view of a still further type of inside mold form.

Figure 9 is a fragmentary enlarged transverse vertical sectional view taken through Figure 8 approximately on the line 9—9.

Figure 10 is a fragmentary enlarged transverse vertical sectional view taken through Figure 1 approximately on the line 10—10.

In accordance with the present invention the upper and lower sections 6 and 7, respectively, of the mold 5 may be of any suitable materials and have their meeting faces cut away at 8 and 9, respectively, to the desired outside contour of the upper and lower surfaces of such a molded object as an aeroplane wing or wing section. The inside mold form or core 10 may be made of wax, composition, plastic, or of rigid material, or of metal parts held together and positioned relative to each other by means of assembling and spacing members which are capable of being dissolved by means of a solvent, or made fluid by application of heat, and capable of dislodgment by pouring, withdrawal by suction, vaporization, or expulsion by centrifugal force. The inside mold form or core 10 may be molded or cast of thermoplastics, waxes, paraffine, glues, composite materials, crystalline substances, soluble substances or of lead or bismuth and alloys which can be removed by heat without harming the molded object or removed by means of solvents such as ketones, hydroxy esters, tetrachlorethane, and ethylene dichloride-alcohol type solvents capable of dissolving a core of cellulose acetate or the like without injuring the molded object, or by a combination of application of heat and solvents and centrifugal force. The material chosen for the inside mold form or core depends on the plastic or composition from which the object to be molded is to be made, whether it is a thermosetting or a thermoplastic plastic, cold molded, molded by evaporation, or molded with heat and/or pressure; or made of fiber or composite material impregnated with plastics or a protein composition to be made into a plastic polyamide by impregnating the same with phenol or dibasic acid.

As applied to the molding of aeroplane wings or sections thereof, or ailerons, rudders, elevators, and movable and fixed control surfaces, the principal object is the molding all in one piece and in one operation, while in the same operation providing the desired spars, ribs, rib braces, reinforcing net work, flanges, transverse bars and reinforcing members on the inside of the hollow wing form and integral therewith, and thereby save time in the manufacturing and molding while at the same time adding strength while reducing weight.

In proceeding in accordance with the present invention, slugs or pins, such as those designated by the numerals 11, 12 and 13, in Figures 2, 3 and 10, formed of the material from which the molded object is to be molded or of other material, are placed in the core before pouring to give the desired thickness to the skin of the wing and the slugs may be left in place as an integral part of the outer surface of the molded object and removed when desired to provide inspection holes. The element 11 comprises a pin extending slightly above and below the core 10 and capped at both ends with slugs engaging the upper and lower mold sections so as to space these sections the desired amount from the mold core and thereby predetermine the thickness of the upper and lower skins of the resultant molded form. When either of the slugs is removed the pin can be withdrawn through the resulting hole. In the event the pin and slug assembly is left in place it acts to keep the top and bottom skins of the wing section or the like properly braced and spaced. The rectangular plug 12, shown in Figure 3 of the drawings, extend through openings formed in the upper section 6 and in the mold core 10 with a space in the core surrounding the plug to be filled with the molding material so that upon removal of the plug 12 a rectangular opening, such as a wing slot is produced.

The plug 13 is similar to the plug 12 in purpose and effect, although more greatly spaced from the opening in the core 10, to provide for molding a circular opening through the wing for attaching external bracing or landing gear to the wing by a bolt or the like (not shown) passing through such circular opening.

Metal reinforcing or other reinforcing may be placed in cavities in the inside mold form or core 10 or through holes resulting from removal of the plugs 11, 12 and 13 before the molding operation is carried out, so that the reinforcement will be integrally formed in the aeroplane wing or the like when the casting operation has been completed. In this way a metal spar may be incorporated and made to extend from the end of the wing for mounting the wing to the aeroplane. If desired, after the hollow wing form or the like has been achieved, the same may be placed in another and larger mold so as to apply a skin thereto of a different material.

Referring to Figures 1 and 2 of the drawings, illustrating a sectional for mof inside molding form or core, it will be evident that the channels 14, 15, and 16 which extend from the top and bottom and side surfaces of the upper and lower mold sections, extend substantially the full length of the form to be molded and are defined by longitudinally divided parts of the inside mold form, the channels 14 and 15 providing for the molding of solid spars. In a modification of this arrangement shown in Figures 4 and 5, the channels 14 and 15 are replaced by grooves 17 and 18, respectively, formed on the top and bottom of the mold form with vertical holes 19 opening through these grooves, thereby providing trussed spars of the lattice, woven or webbed type in the molded object. Holes through the core 10 for molding truss braces are designated 18, 19, 21, 22, 22b, 23, and 26.

Holes through the core for forming a trussed rib comprise those designated 15ª and 19. The inclining and inclining connected channels 32 and 33 shown in Figure 5 of the drawings define intermal truss braces which result from the molding operation, and the opening of these channels 32 and 33 into the rib forming channels 14ª and 15ª result in the formation of internal trussed ribs, thereby reducing bulk and weight while providing adequate or additional strength. For forming untrussed flying spars or continuations of the trussed spars, grooves 20 extending out through the end of the form are provided. If desired all three types of spars may be made in one spar, each being a continuation of the other, as indicated by the presence of the corresponding grooves in the various figures of the drawings, brace accommodating holes being provided to open into the brace forming grooves 22b in Figures 6 and 7, and in other groove formations to provide for joining ribs, spars, and the transverse rib reinforcements. The rib forming grooves 22, in the form of the invention shown in Figures 1 and 2 of the drawings may be provided with grooves on both sides of the inside mold form and connected by the rib brace forming holes 23 similar to the spar brace forming hole 19 already alluded to in connection with Figure 5 of the drawings.

For producing flying and transverse sectional rib braces, registering grooves are provided on both sides of the inside mold form with some of these grooves communicating with each other as indicated by the numeral 24 in Figure 1 and other being unconnected as indicated at the point designated by the numeral 25 in Figure 1, and with or without the brace forming holes 23.

All-over transverse braces are provided by intersecting sides or grooves 26 as indicated in Figure 6, the upper and lower grooves of the mold form being provided with or without connecting brace forming holes. Also, all-over rib or honeycomb network, inside skin reinforcing, are provided by depressions or grooves 29 in the upper and/or lower surfaces of the inside mold form or core as indicated in Figure 8 of the drawings and also in Figure 9 therein, wherein the mold form is generally designated by the numeral 10c. If desired, lugs 30, shown in Figure 1 of the drawings, may be molded by having suitable depressions in the upper and lower mold sections 6 and 7 so that they will be molded in the finished product to provide for attachment of ailerons.

A relatively large rectangular hole 31 or slot formed all the way through the inside mold form is provided for molding wing slots, and a tight fitting slug 12 is inserted through the outside wall through the opening 12′ as indicated in Figure 3, with sufficient spacing being provided in the corresponding hole in the mold form as indicated in Figure 3 to provide wing slots in the same manner as for attaching exterior bracing. Pieces or slugs mounted on the surfaces of the core form to get the thickness of the outside skin or surface of the finished product may be of material from which the wing is molded or of other material and may be left in place as an integral part of the wing or removed for inspection hole mountings. Plugs or pieces may be mounted in the longitudinally outward ends of the longitudinal grooves as in the opposite ends of the transverse grooves to provide upon their removal holes through which the material from the inside mold can flow by gravity or by reason of application or centrifugal force to the solution or other fluid form of the mold material.

Suitable material for molding aeroplane wings in accordance with the present invention comprise fiber saturated with "Bakelite," protein and polymers of the "Nylon" type, phenol-formaldehyde synthetic resins, and also proteins saturated with formaldehyde in which is embedded fiber.

Although I have shown and described herein preferred embodiments of my invention, it is to be definitely understood that I do not desire to limit the application of the invention thereto, except as may be required by the scope of the subjoined claims.

Having described the invention, what I claim as new is:

1. A mold for molding a hollow aeroplane wing or the like in one piece, said wing comprising a shell having upper and lower walls characterized by trussed spars and trussed ribs and diagonal bracing, formed interiorly on the walls, said mold comprising a lower section having its upper surface formed to define the contour and plan shape of the lower wall of the wing, an upper section having its under surface formed to define the contour and plan shape of the upper wall of the wing, means supportably mounting said upper section on said lower section, a core within the space defined by the contour forming area of the under surface of said upper section and the contour forming area of the upper surface of said lower section, said core being of material capable of dissolution and removal without disturbing the mated relation of the upper and lower walls of the aeroplane wing, spacing means for determining and maintaining the vertical spacing of the upper and lower faces of the core from the contour forming areas of the upper and lower mold sections, said spacing means comprising vertical slugs extending through accommodating openings formed in said core, said slugs supportably resting on the upper surface of said lower mold section and being supportably engaged with the upper mold section.

2. A mold as described by claim 1 wherein said slugs comprise vertical pins traversing accommodating openings formed in said core and have enlarged removable heads acting as spacing blocks between the upper and lower faces of the mold core and the corresponding surfaces of the mold sections.

3. A mold as described by claim 1 wherein said mold core has its upper and lower faces formed with longitudinal and transverse intersecting channels to define interlocking internal spars and ribs.

4. A mold as described by claim 1 wherein said core has its upper and lower faces formed with transverse and longitudinal intersecting channels to define internal interlocking ribs and spars, said mold core further being formed with intersecting diagonal channels in horizontal planes, the last mentioned channels leading into some of said transverse and longitudinal channels to define internal cross bracing integral with the spars and ribs.

MURRAY BROSIUS.